United States Patent
Abbestam

(10) Patent No.: US 8,322,516 B2
(45) Date of Patent: Dec. 4, 2012

(54) PALLET AND A PALLET SYSTEM

(75) Inventor: Göran Abbestam, Partille (SE)

(73) Assignee: FlexLink Components AB (SE)

( * ) Notice: Subject to any disclaimer, the term of this patent is extended or adjusted under 35 U.S.C. 154(b) by 304 days.

(21) Appl. No.: 12/677,284

(22) PCT Filed: Sep. 14, 2007

(86) PCT No.: PCT/SE2007/050653
§ 371 (c)(1),
(2), (4) Date: Jun. 16, 2010

(87) PCT Pub. No.: WO2009/035389
PCT Pub. Date: Mar. 19, 2009

(65) Prior Publication Data
US 2010/0252402 A1 Oct. 7, 2010

(51) Int. Cl.
*B65G 17/32* (2006.01)
(52) U.S. Cl. ...................... 198/465.1; 198/841
(58) Field of Classification Search .... 198/465.1–465.3, 198/795, 867.13, 841
See application file for complete search history.

(56) References Cited

U.S. PATENT DOCUMENTS

| | | | | |
|---|---|---|---|---|
| 4,605,121 A * | 8/1986 | Wahren | ............... | 198/867.13 |
| 5,000,311 A * | 3/1991 | Abbestam et al. | ....... | 198/867.14 |
| 5,247,789 A * | 9/1993 | Abbestam et al. | ............... | 59/78 |
| 5,372,240 A * | 12/1994 | Weskamp | ............... | 198/465.1 |
| 5,447,220 A * | 9/1995 | Weskamp | ............... | 198/465.2 |
| 5,579,695 A * | 12/1996 | Cockayne | ............... | 104/140 |
| 6,112,886 A | 9/2000 | Horn | | |
| 6,135,266 A | 10/2000 | Weskamp | | |
| 6,460,684 B1 * | 10/2002 | Sullivan | ............... | 198/465.1 |
| 7,219,793 B2 * | 5/2007 | Robertsson et al. | ......... | 198/795 |
| 7,320,396 B2 * | 1/2008 | Oppermann | ............ | 198/867.13 |

FOREIGN PATENT DOCUMENTS

DE  202005010993 U1  9/2005
GB  2361683 A  10/2001

OTHER PUBLICATIONS

"International Application Serial No. PCT/SE2007/050653, International Preliminary Report on Patentability completed Nov. 30, 2009", 5 pgs.

"International Application Serial No. PCT/SE2007/050653, International Search Report mailed May 15, 2008", 4 pgs.

* cited by examiner

*Primary Examiner* — Mark A Deuble
(74) *Attorney, Agent, or Firm* — Schwegman Lundberg & Woessner, P.A.

(57) ABSTRACT

Pallet (1) for a conveyer system, comprising a body (2), a first guide disc (3) and a second guide disc (4) attached to the body (2), where a first slide plate (9) is mounted to the first guide disc (3) and a second slide plate (10) is mounted to the second guide disc (4), characterized in that the slide plates (9, 10) are mounted to the guide discs (3, 4) with a snap locking by means of a plurality of protrusions (11, 12, 13). The advantage of the invention is that a pallet can easily be adapted for a different use in a conveyor system.

9 Claims, 4 Drawing Sheets

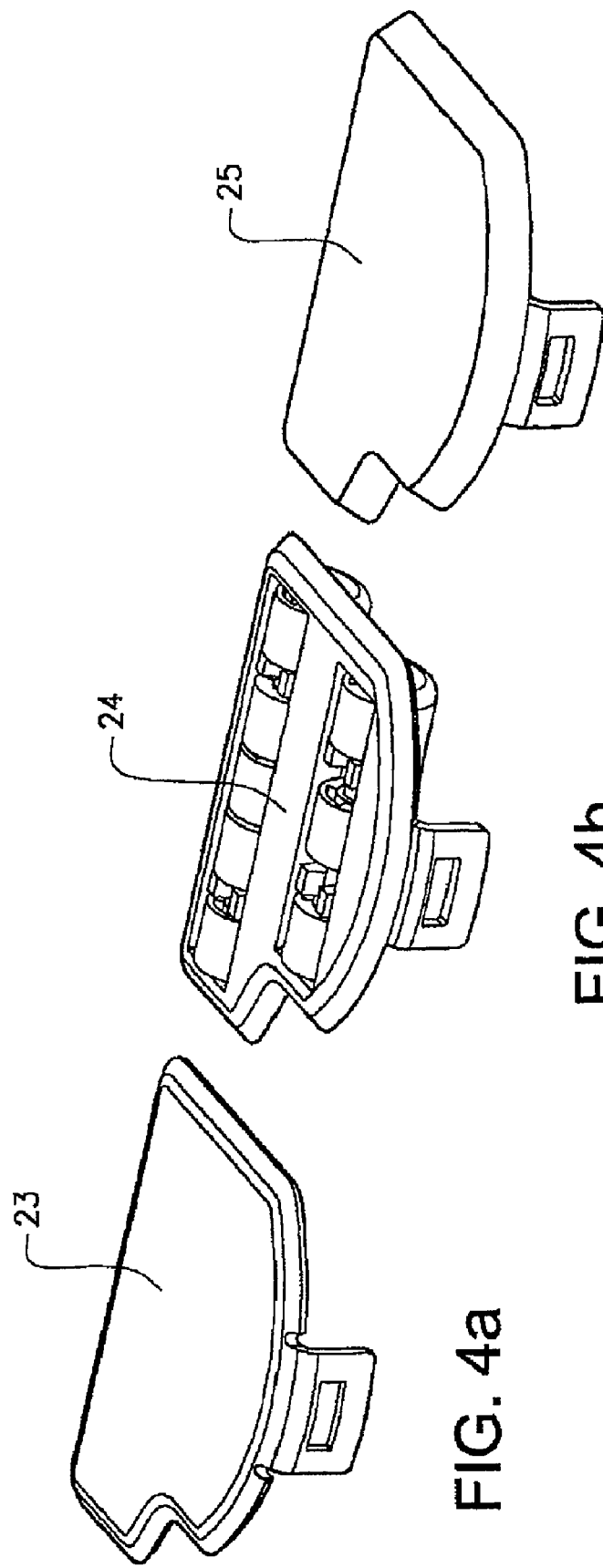

PALLET AND A PALLET SYSTEM

RELATED APPLICATIONS

This application is a nationalization under 35 U.S.C. 371 of PCT/SE2007/050653, filed Sep. 14, 2007 and published as WO 2009/035389 A1 on Mar. 19, 2009, 7; which application and publication are incorporated herein by reference and made a part hereof.

TECHNICAL FIELD

The present invention relates to a pallet with interchangeable slide plates for a conveyor system.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via supporting means, which are also known as pallets.

A pallet is conveyed along the conveying device, which comprises different work stations. The conveying device may be adapted to different environments. In some cases, the conveying device is located in a clean environment, where e.g. an object is assembled from pre-fabricated parts and where no machining is performed. In such environments, the specifications for the conveyor track and the pallets can be less demanding. The conveyor chain may be a plain plastic chain and the pallet may be provided with plastic glide plates. The conveyor chain and/or pallet may also be of other types intended for a clean environment.

When the conveying device is situated in a tough environment, e.g. where machining is performed on the objects carried by the pallets, or where dust, metal chips or similar is present, a higher demand is put on the conveyor chain and pallets regarding wear resistance. The conveyor chain may e.g. be provided with a steel top and may be of a type that shields of the interior of the conveyor track. The pallet may be provided with a steel slide plate. A slide plate is attached to the pallet with e.g. screws or rivets, or it may be integrated with the pallet.

Normally, the height of a conveyor chain depends on the type of chain. A plain plastic chain normally has a different height than a chain provided with a steel top or a metal chain. Thus, the pallets to be used with a specific chain must be special for that chain. Another possibility is to adapt the height of the guide rails to the specific combination. There are thus a number of different conveyor chains and pallet types to choose between, and the choice must be made in advance, depending on the requirements.

For some industries with different types of production, e.g. with production in both clean and tough environment, this means that a number of different pallets are needed to be able to support all types of conveyor chains. This is both uneconomical and requires extra storage space. There is thus room for improvements.

DISCLOSURE OF INVENTION

An object of the invention is therefore to provide a pallet with interchangeable slide plates for a conveyor system. A further object of the invention is to provide a pallet system comprising interchangeable slide plates. Another object of the invention is to provide a conveyor system comprising pallets with interchangeable slide plates.

The solution to the problem according to the invention is described in the characterizing part of claim 1. Claim 9 contain an advantageous pallet system. The other claims contain advantageous embodiments and further developments of the diverter device.

In a pallet for a conveyer system, comprising a body, a first guide disc and a second guide disc attached to the body, where a first slide plate is mounted to the first guide disc and a second slide plate is mounted to the second guide disc, the object of the invention is achieved in that the slide plates are mounted to the guide discs with a snap locking by means of a plurality of protrusions.

By this first embodiment of the pallet according to the invention, the slide plates of the pallet can be easily exchanged or replaced. This is advantageous in that a pallet can be adapted for another use in an easy way, without the need of using tools.

In an advantageous development of the invention, the guide disc comprises at least one catch having a locking nose adapted to interact with a locking groove in at least one protrusion of the slide plate. The advantage of this is that the slide plate can be mounted in an automatic process.

In another advantageous development of the invention, the at least one catch and/or the at least one protrusion is resilient. This allows for an easy mounting and dismounting of the slide plate.

In another advantageous development of the invention, the guide discs comprise a locking shoulder adapted to interact with a third protrusion of the slide plate. This allows a secure locking of a slide plate to a guide disc.

In another advantageous development of the invention, the third protrusion is resilient. This allows for an easy mounting and dismounting of the slide plate.

In a pallet system, comprising an inventive pallet, the system further comprises a second set of slide plates being of a different type. This is advantageous in that the same pallet can be used in a second conveyor system, e.g. being set up for a different environment or having guide rails with a different height.

In an advantageous further development of the inventive system, the second slide plate is one of the following: a plastic slide plate, a slide plate made of a metal, a slide plate made of conductive plastic, or a slide plate provided with rollers. This is advantageous in that a pallet can be adapted to a plurality of different conveyor systems in an easy way.

BRIEF DESCRIPTION OF DRAWINGS

The invention will be described in greater detail in the following, with reference to the embodiments that are shown in the attached drawings, in which FIG. 4*a-c* shows different types of slide plates for the pallet according to the invention.

MODES FOR CARRYING OUT THE INVENTION

The embodiments of the invention with further developments described in the following are to be regarded only as examples and are in no way to limit the scope of the protection provided by the patent claims.

Figure 1:
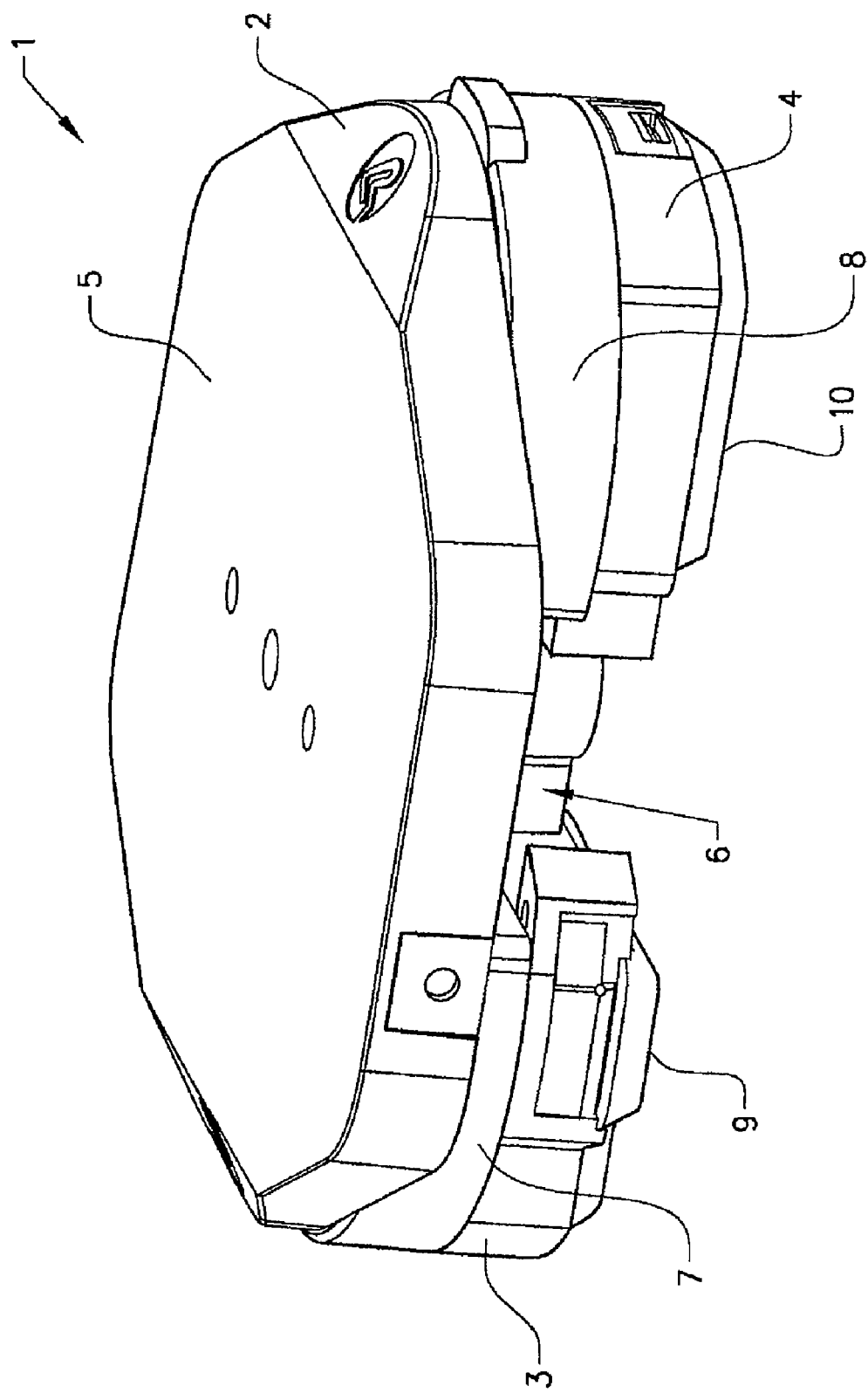
FIG. 1 shows a first embodiment of a pallet according to the invention.
Figure 2:
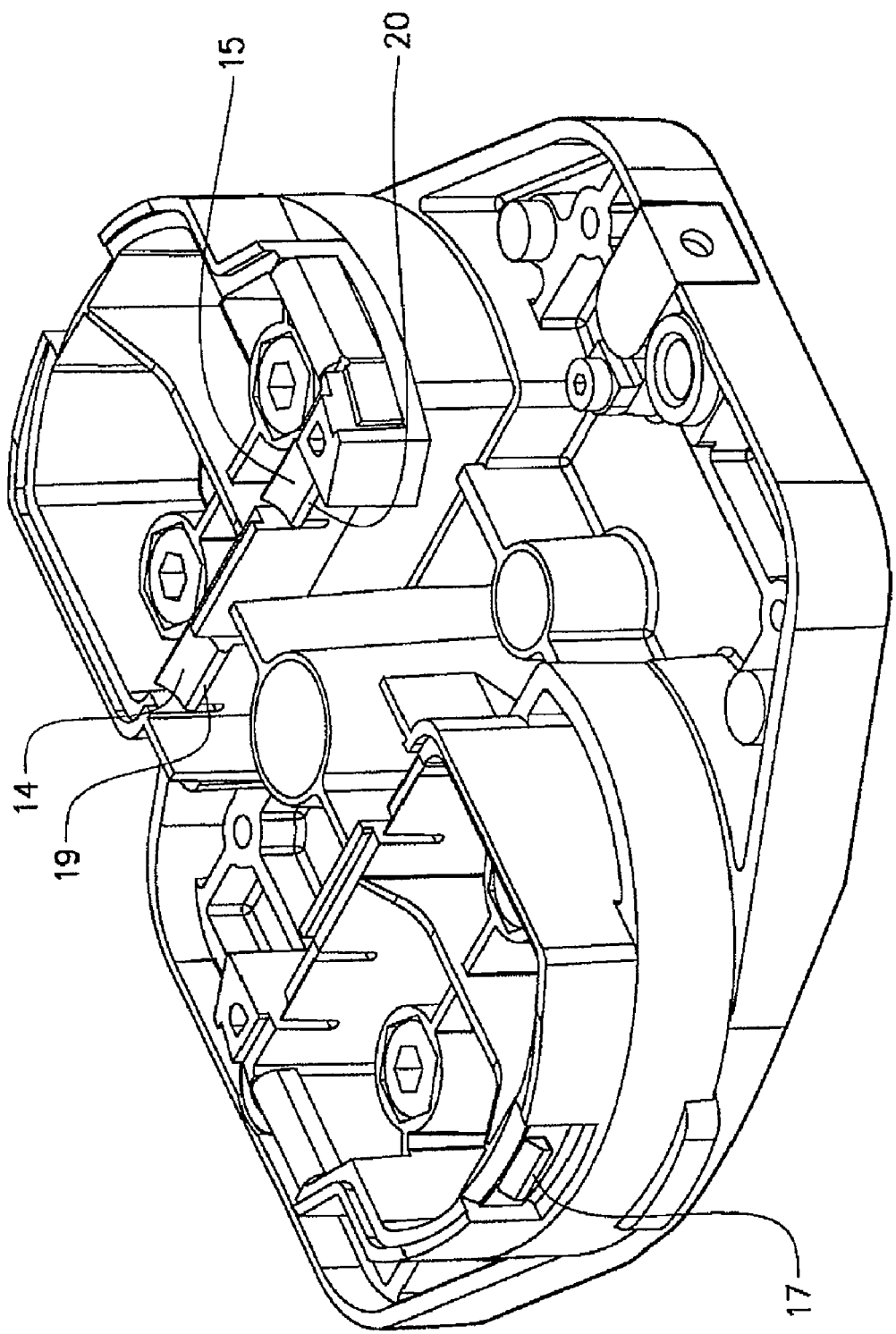
FIG. 2 shows the pallet according to the invention from below.

FIG. 1 shows a first embodiment of a pallet for a conveyor system according to the invention, and FIG. 2 shows the same pallet from below. The pallet 1 comprises a body 2, a first guide disc 3 and a second guide disc 4. The guide discs 3, 4 are located at the underside 6 of the body, i.e. underneath the body. The body further comprises an upper support surface 5. The body is preferably made from a light but stiff material, such as an aluminium alloy or a plastic composite. The body may be produced using injection moulding. The support surface 5 is provided with fastening means, e.g. threaded holes, on which holders for the objects that are to be conveyed can be mounted.

The guide discs 3, 4 may be integrated in the body, but more preferably they are fitted to the body in such a way that a new guide disc can be fitted to the body if the first guide disc breaks or wears out. Suitable mounting means may be screws or clips. The guide discs are preferably made of a low-friction material such as a plastic material, so that the friction between the guide discs and the guide rails is reduced as much as possible.

The guide discs are adapted to guide the pallet in the conveyor track. The guide discs are thus provided with lateral guide surfaces 7, 8 intended to guide the pallet sideways between the guide rails of the conveyor track. The first guide disc 3 is provided with a first guide surface 7 and the second guide disc 4 is provided with a second guide surface 8. The height of the guide surface 7, 8 corresponds to the height of the guide rails, thus the height of the guide surface does not have to extend over the total height of the guide disc.

The guide discs are further provided with slide plates on which the pallet is conveyed on the conveyor track. The first guide disc 3 is provided with a first slide plate 9 and the second guide disc 4 is provided with a second slide plate 10. There are different types of slide plates and they can be made in different shapes and materials in order to meet the requirements for the specific use. If a low friction is required, a low friction plastic or even rollers may be used in the slide plate. If a high wear resistance is required, the slide plate may be made from a metal.

The height of the guide disc and the slide plate determines the height to the underside of the pallet. This measure determines in turn the required height of the guide rail, which is the distance from the upper side of the conveyor chain to the upper side of the guide rail. Since the pallet does not bear on the upper side of the guide rail, there should be a small play between the underside of the pallet and the upper side of the guide rail when a pallet is conveyed. The pallet thus bears on the conveyor track with the slide plate against the conveyor chain and with the lateral guide surfaces against one of the inner sides of the guide rails.

The guide rails are attached to the conveyor beam using guide rail brackets. The guide rail brackets are normally of a fixed height type which facilitates the mounting and adjustment of the conveyor system. The consequence of this is that the height of the guide rail is fixed, and can only be changed with great difficulties, i.e. by rebuilding the complete system. Since the conveyor chains have different heights depending on the type of chain, the guide disc and the slide plate must be selected depending on the used conveyor chain and guide rails. Thus, in a normal conveyor system, a dedicated set of conveyor tracks and pallets are used, adapted for one specific conveyor system.

In the inventive pallet, the slide plate may easily be replaced by another slide plate in order to adapt the pallet to another use. This enables the use of a pallet in another conveyor system, having a different type of conveyor chain, or allows the properties of the pallet to be adapted for a new use in an existing conveyor system, e.g. by mounting another type of slide plate. This also allows for an easy and quick replacement of a damaged slide plate.

Figure 3:
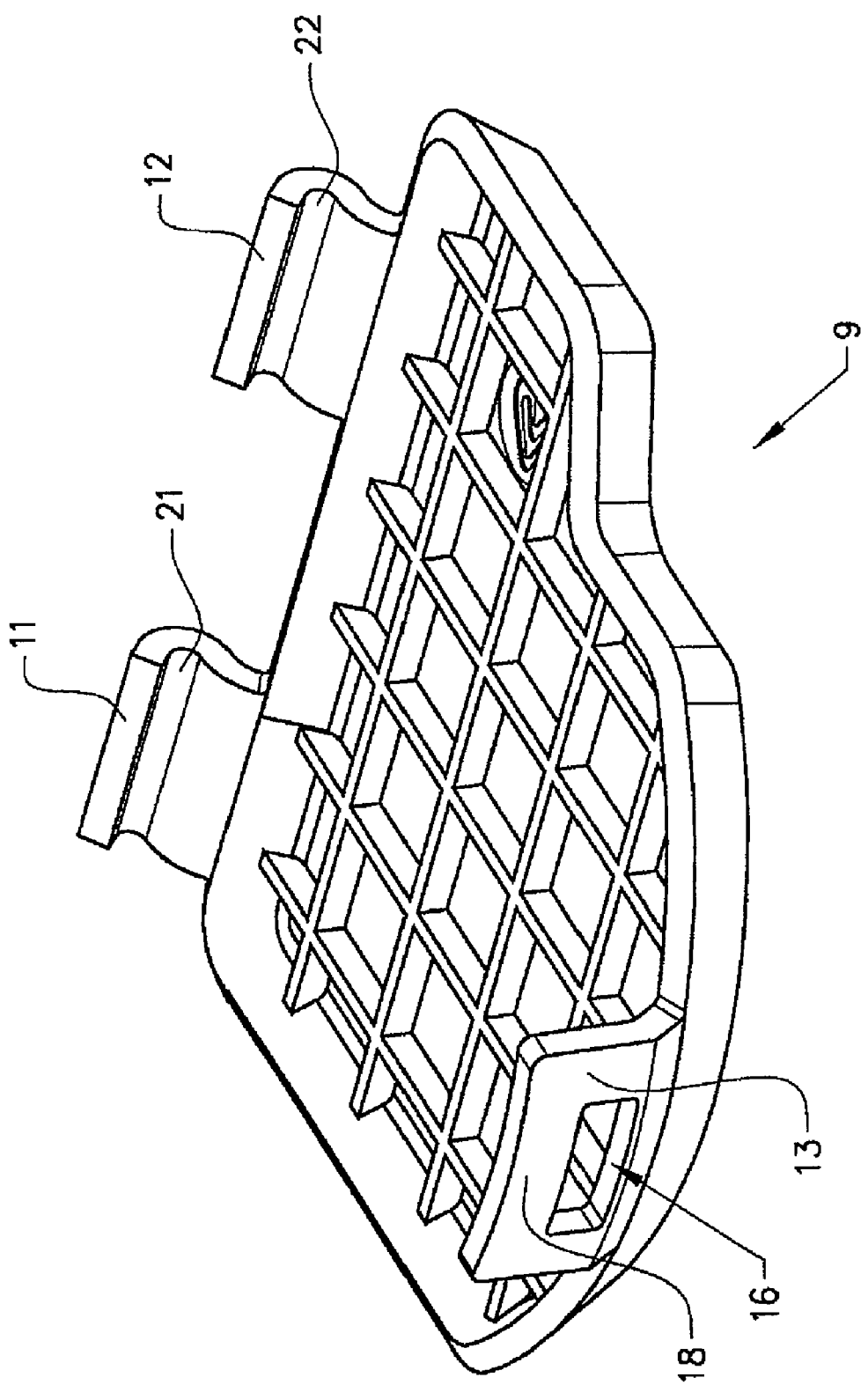
FIG. 3 shows a slide plate for the pallet according to the invention from below.

A slide plate 9, 10 is, as shown in FIG. 3, provided with, in this example, a first protrusion 11 and a second protrusion 12 at the inner side and a third protrusion 13 at the outer side. Outer and inner side refers to the directions on the pallet when the slide plate is mounted to the pallet. The first protrusion 11 comprises a first locking groove 21 and the second protrusion 12 comprises a second locking groove 22. The two inner protrusions are to be located around a first catch 14 and a second catch 15 in the guide disc. The first catch 14 comprises a first locking nose 19 and the second catch 15 comprises a second locking nose 20. The locking noses form the catches into a hook shape so that the two inner protrusions can be held securely in position when the slide plate is mounted. The catches 14, 15 are further somewhat resilient, in order to facilitate an automatic mounting of the slide plate and to compensate for any play caused by tolerance differences when the slide plate is mounted.

The first protrusion 11, the second protrusion 12 and the third protrusion 13 are all intended to interact with the first catch 14, the second catch 15 and the locking shoulder 17 from the outer side. The first locking groove 21 and the second locking groove 22 are thus directed inwards. Correspondingly, the first locking nose 19, the second locking nose 20 and the locking shoulder 17 are directed outwards. This means that when the slide plate is mounted, the first protrusion 11 will cover the first catch substantially, the second protrusion 12 will cover the second catch substantially and the third protrusion 13 will cover the locking shoulder 17 substantially. The advantage of using outer locking means is that the removal of the slide plate is easier and that the hold of the slide plate is simplified. This simplifies the inner design of the slide plate.

The third protrusion 13 is in this embodiment provided with an opening 16. The opening is adapted to interact with a locking shoulder 17 in the guide disc. The locking shoulder is provided with a bevel that allows the third protrusion 13 to be snap locked to the locking shoulder. The third protrusion 13 is somewhat resilient in order to allow the mounting of the slide plate. One advantage of using a locking arm and an opening to lock the slide plate is that the locking shoulder is visible in the opening when the slide plate is locked properly. The locking arm can pivot around the locking shoulder when the slide plate is mounted or removed. The third protrusions 13 and the locking shoulder 17 will thus resemble a hinge. In one embodiment, the third protrusion is provided with a resilient catch instead of a locking arm.

A slide plate can be mounted in two ways. In the first way, the mounting is done in an automatic process. In the automatic process, the slide plate will be moved towards the guide disc in a parallel manner. The three mounting points will in this case be snapped together at the same time. Just before the two parts are mounted together, the first protrusion 11 will bear on the first catch 14, the second protrusion 12 will bear on the second catch 15 and the third protrusion 13 will bear on the locking shoulder 17. When the slide plate is forced closer to the guide disc, the first protrusion 11 and the first catch 14 will both spring somewhat, allowing the front part of the first protrusion to pass the nose of the first catch. The same will happen to the second protrusion 12 and the second catch 15. At the same time, the third protrusion 13 will spring on the locking shoulder 17, so that the locking arm 18 of the third protrusion can pass the locking shoulder. When the slide plate bears on the guide disc, it is secured to the guide disc by the three protrusions. Thus, the first locking groove 21 is locked against the first locking nose 19, the second locking groove 22 is locked against the second locking nose 20, and the locking arm 18 is locked by the locking shoulder 17.

In the second way of mounting the slide plate to the guide disc, the mounting is done by hand, but could also be automated. This may be advantageous in that an operator easily can exchange a slide plate when the need arises, without the need of any tools. In the manual mounting, the slide plate will first be positioned so that the locking arm 18 of the third protrusion 13 is positioned underneath the locking shoulder 17, so that the opening 16 of the third protrusion 13 encircles the locking shoulder 17.

The slide plate is in this example held at a distance from the catches 14, 15. During the mounting, the slide plate is rotated around the third protrusions so that the first protrusion 11 bears on the first locking catch 14 and the second protrusion 12 bears on the second catch 15. By applying some force on the slide plate, the first protrusion 11 and the first catch 14 springs somewhat so that the first locking groove 21 is caught by the first locking nose 19, and the second protrusion 12 and the second catch 15 springs somewhat so that the second locking groove 22 is caught by the second locking nose 20. The force required when mounting the slide plate manually is lower than the force required during the automated mounting, since in the manual mounting, all protrusion must not deflect at the same time.

To remove a slide plate from the guide disc, the first and the second protrusions are deflected so that the locking grooves are released from the locking noses. It is also possible to deflect the third protrusion so that the locking arm is released from the locking shoulder. Depending on the design of the protrusions, the release can be done either using a tool, e.g. a screwdriver, or by hand.

An inventive pallet system comprises a pallet and a number of different slide plates that can be easily exchanged. FIG. 4a-c shows some examples of different types of slide plates for a pallet comprised in the system. In FIG. 4a is shown a slide plate made of a metal, in FIG. 4b is shown a slide plate provided with rollers, and in FIG. 4c is shown a plastic slide plate. The plastic slide plate may be made in a suitable plastic material, e.g. a polyamide, an acetal resin or a conductive acetal resin.

The invention is not to be regarded as being limited to the embodiments described above, a number of additional variants and modifications being possible within the scope of the subsequent patent claims. The locking means locking the slide plate to the guide disc may e.g. be of any suitable type.

REFERENCE SIGNS

1: Pallet
2: Body
3: First guide disc
4: Second guide disc
5: Upper support surface
6: Underside
7: First guide surface
8: Second guide surface
9: First slide plate
10: Second slide plate
11: First protrusion
12: Second protrusion
13: Third protrusion
14: First catch
15: Second catch
16: Opening
17: Locking shoulder
18: Locking arm
19: First locking nose
20: Second locking nose
21: First locking groove
22: Second locking groove
23: Metal slide plate
24: Roller slide plate
25: Plastic slide plate

The invention claimed is:

1. A pallet for a conveyer system, comprising:
a body,
a first guide disc and a second guide disc attached to the body, where a first slide plate is mounted to the first guide disc and a second slide plate is mounted to the second guide disc,
wherein the slide plates are mounted to the guide discs with a snap locking by means of a plurality of protrusions, and
wherein the guide discs comprises a locking shoulder adapted to interact with a third protrusion of the slide plate.

2. The pallet according to claim 1, wherein the guide disc comprises at least one catch having a locking nose adapted to interact with a locking groove in at least one protrusion of the slide plate.

3. The pallet according to claim 2, wherein the at least one catch is resilient.

4. The pallet according to claim 2, wherein the at least one protrusion is resilient.

5. The pallet according to claim 2, wherein the at least one protrusion is hook shaped.

6. The pallet according to claim 1, wherein the third protrusion is resilient.

7. The pallet according to claim 1, wherein the third protrusion comprises a locking arm for the interaction with the locking shoulder.

8. A system comprising:
a pallet system;
a pallet for the pallet system, the pallet including:
a body,
a first guide disc and a second guide disc attached to the body, where a first slide plate is mounted to the first guide disc and a second slide plate is mounted to the second guide disc,
wherein the slide plates are mounted to the guide discs with a snap locking by means of a plurality of protrusions;
wherein the pallet system further comprises a second set of slide plates being of a different type, and
wherein the guide discs comprises a locking shoulder adapted to interact with a third protrusion of the slide plate.

9. The system according to claim 8, wherein the second set of slide plates includes one of the following: a plastic slide plate, a slide plate made of a metal, a slide plate made of conductive plastic, or a slide plate provided with rollers.

* * * * *